US010037355B2

(12) United States Patent
Velury (10) Patent No.: US 10,037,355 B2
(45) Date of Patent: Jul. 31, 2018

(54) MECHANISMS FOR MERGING INDEX STRUCTURES IN MOLAP WHILE PRESERVING QUERY CONSISTENCY

(71) Applicant: Futurewei Technologies, Inc., Plano, TX (US)

(72) Inventor: Ramabrahmam Velury, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 426 days.

(21) Appl. No.: 14/793,557

(22) Filed: Jul. 7, 2015

(65) Prior Publication Data

US 2017/0011082 A1    Jan. 12, 2017

(51) Int. Cl.
*G06F 17/30* (2006.01)

(52) U.S. Cl.
CPC .... *G06F 17/3038* (2013.01); *G06F 17/30563* (2013.01); *G06F 17/30592* (2013.01)

(58) Field of Classification Search
CPC .......... G06F 17/3038; G06F 17/30563; G06F 17/30592; G06Q 10/0637
USPC ........................................................ 707/600
See application file for complete search history.

(56) References Cited

U.S. PATENT DOCUMENTS

| 6,917,940 B1* | 7/2005 | Chen ................. G06F 17/30592 |
| 7,007,020 B1* | 2/2006 | Chen ................. G06F 17/30539 |
| | | 705/7.29 |
| 7,133,876 B2* | 11/2006 | Roussopoulos ... G06F 17/30592 |
| | | 707/752 |
| 8,868,544 B2* | 10/2014 | Witkowski ........ G06F 17/30592 |
| | | 707/713 |

(Continued)

FOREIGN PATENT DOCUMENTS

| CN | 102360379 B | 1/2013 |
| CN | 103049556 | 4/2013 |

(Continued)

OTHER PUBLICATIONS

"International Application No. PCT/CN2016/088899, International Search Report and Written Opinion dated Sep. 22, 2016", (Sep. 22, 2016), 13 pgs.

(Continued)

*Primary Examiner* — Evan S Aspinwall
(74) *Attorney, Agent, or Firm* — Schwegman Lundberg & Woessner, P.A.

(57) ABSTRACT

Novel methods are described herein to provide an OLAP database system that performs lock-less bulk insertion while maintaining high query performance and minimizing additional storage requirements. Aspects of the claimed subject matter include novel methods for merging two index structures while maintaining query consistency without the use of a versioning scheme by using copies of vertical segments of an index tree page; a method to prepare and merge two index (Continued)

structures that operates within storage constraints; and a method to execute queries concurrently while index maintenance is in progress while still producing consistent results. According to an aspect of the present disclosure, a flexible index merge mechanism is provided that merges data from incremental indices to a primary data index in three phases: a load phase, a copy phase, and a replace phase.

25 Claims, 7 Drawing Sheets

(56) References Cited

U.S. PATENT DOCUMENTS

| 2003/0126143 | A1 | 7/2003 | Roussopoulos et al. |
| 2009/0327330 | A1* | 12/2009 | Abouzied ......... G06F 17/30442 |
| 2010/0146003 | A1 | 6/2010 | Bruso et al. |
| 2010/0281013 | A1 | 11/2010 | Graefe |
| 2011/0320398 | A1* | 12/2011 | Abdellatif Abouzeid ......... G06F 17/30442 707/600 |
| 2015/0186453 | A1 | 7/2015 | Agarwal et al. |

FOREIGN PATENT DOCUMENTS

| CN | 103544258 | 1/2014 |
| KR | 10-1331350 B1 | 11/2013 |
| WO | WO-2013/180732 A1 | 12/2013 |

OTHER PUBLICATIONS

"European Application Serial No. 16820843.7, Supplementary European Search Report dated Mar. 13, 2018", 10 pgs.

* cited by examiner

Exemplary Computer
System 700

Figure 7

MECHANISMS FOR MERGING INDEX STRUCTURES IN MOLAP WHILE PRESERVING QUERY CONSISTENCY

TECHNICAL BACKGROUND

In database computing, online analytical processing—or "OLAP"—is an approach to managing multi-dimensional analytical (MDA) queries swiftly. OLAP tools enable users to analyze multidimensional data interactively from multiple perspectives. Databases configured for OLAP use a multi-dimensional data model, that allows complex analytical and ad hoc queries to be performed rapidly. At the core of any OLAP system is an OLAP data cube (also called a 'multi-dimensional cube' or a hypercube). It consists of data called "measures" that are categorized along multiple dimensions. The measures are placed at the intersections of the hypercube, which is spanned by the dimensions as a vector space. The usual interface to manipulate an OLAP cube is a matrix interface, which performs projection operations along the dimensions, such as aggregation or averaging.

Multidimensional Online Analytical Processing or "MOLAP" is a multi-dimensional index store that is customized for OLAP systems by using custom indexing, partitioning, in-memory, columnar storage and pre-aggregation techniques to achieve greater efficacy. MOLAP implementations typically require some pre-computation and storage of information in the OLAP cube. Typically, MOLAP solutions store data in an optimized multidimensional array storage structure, such as a B-Tree.

Many approaches have been developed to perform bulk-insertion of data into OLAP systems. Existing OLAP bulk insertion techniques typically rely on B-Tree update techniques using locking mechanisms. For example, one technique involves B-Tree pages or key ranges and impacts query performance due to the need to lock the pages or key ranges during insertion. These mechanisms are non ideal for bulk updates to B-Tree indexed structures where large number of updates need to be made in a single transaction, which are common for updates in an OLAP environment. These techniques are unable to maintain both consistency and update/query performance simultaneously.

Another technique relies on merging existing data with incremental data out of place in a separate storage (e.g., a disk or memory) and switching to newly merged data once the merge is complete. Such a technique provides query consistency and no down time but requires additional storage, since sufficient additional storage is necessary to store the existing data and new data to perform the merging of data. For in-memory OLAP deployments, this is not a feasible solution. Other techniques rely on a down time window, where an index is dropped and rebuilt. However, queries cannot be run during this down time window. Yet another technique relies on storing incremental data separately without merging incremental data with existing data. This technique affects query performance since queries now need to run on all increments of data in order to generate a complete answer. The query performance goes down with the number of individual increments present. Finally, another known technique relies on partitioning of B-Tree indexed data, with multiple B-Tree indices. Unfortunately, this technique also negatively impacts query performance as the number of partitions increase.

None of these techniques address in-place bulk updating of an index while maintaining query performance or query result consistency during an update. Moreover, none of the proposed techniques are able to adequately address each of concerns relating to query performance during an update, query down-time, data consistency, storage constraints, and optimization.

SUMMARY OF THE INVENTION

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Accordingly, a solution to the problems and challenges inherent to the conventional MOLAP systems described above, novel methods are described herein to provide an MOLAP database system that performs lock-less bulk insertion while maintaining high query performance and minimizing additional storage requirements. Aspects of the claimed subject matter include novel methods for merging two index structures while maintaining query consistency without the use of a versioning scheme by using copies of vertical segments of an index tree page; a method to prepare and merge two index structures that operates within storage constraints; and a method to execute queries concurrently while index maintenance is in progress while still producing consistent results.

According to an aspect of the present disclosure, a flexible index merge mechanism is provided that merges data from incremental indices to a primary data index in three phases: a load phase, a copy phase, and a replace phase.

During the first or "load" phase, incoming data is loaded into incremental data hypercubes. Data is not merged into the main data cube until a size threshold of an intermediate data cube is reached. Received queries are answered by running the query on all incremental cubes and aggregating the determined results. In order to keep the number of incremental cubes below a maximum count, incremental cubes are periodically merged out of place using an intermediate cube, and only when sufficient storage is available for merge.

During the second or "copy" phase, one or more pages from the primary incremental cube is selected to merge to the main cube. According to one or more embodiments, the selected pages may be vertical slice(s) in the B-Tree of the main cube that overlap the data selected from the primary incremental cube. The vertical segment may be chosen based on the storage available for merging. Next, a copy of the identified vertical slice from the main B-Tree is created and used for merging data from the primary incremental cube. A copy of the vertical slice in the primary incremental cube is also created.

In the third and last "replace" phase, the data in the copies of pages made from the main cube and incremental cube are then merged together by replacing the data in the page of the main cube with the data in the copy of the page made from the main cube, thus completing the process. By using copies of vertical segments of B-Tree pages of an OLAP database, data consistency is maintained during queries. In addition to improved OLAP query performance, other advantages provided by the novel methods described herein include having no down-time involved for queries during index maintenance, Locking of data segments or pages is not required for queries—resulting in less complex processing and higher throughput, data is completely indexed during its entire life cycle, queries get a consistent snapshot of data during index maintenance.

BRIEF DESCRIPTION OF THE DRAWINGS

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein describing the operations of this process, such steps and sequencing are exemplary. Embodiments are well suited to performing various other steps or variations of the steps recited in the flowchart of the figure herein, that not all of the steps depicted may be performed, or that the steps may be performed in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The claimed subject matter provide an OLAP database system that performs lock-less bulk insertion while maintaining high query performance and minimizing additional storage requirements.

Exemplary Data Cube Merging

Figure 1:
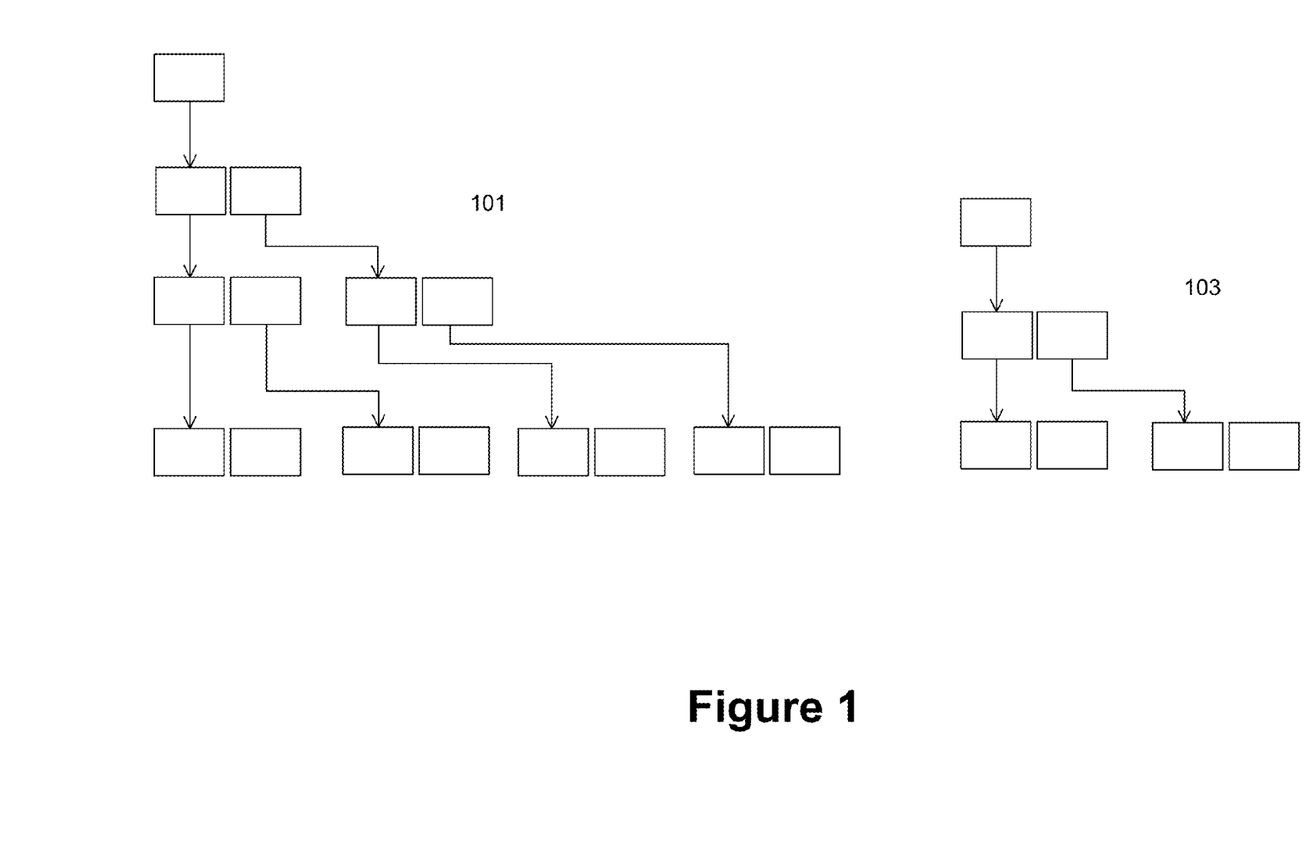
FIG. 1 depicts exemplary pages of B-Tree indices of MOLAP data cubes, in accordance with embodiments of the present invention.

FIG. 1 depicts exemplary pages of multi-dimensional data cubes, in accordance with embodiments of the present disclosure. In one or more embodiments, the multi-dimensional data cubes may be data cubes in a multi-dimensional online analytical processing ("MOLAP") database, indexed as binary search trees (e.g., trees 101, 103) comprising a root node and a plurality of successive leaf nodes. In one or more embodiments, the index may be implemented as a B-Tree, or any like data structure that is capable of keeping stored data sorted and allows for searches, sequential access, bulk insertions, and deletions in substantially logarithmic time.

According to one or more embodiments, the MOLAP database may consist of a main data cube (corresponding to tree 101) that operates as the primary collection of data in the database. Incoming data during a bulk insertions (e.g., data that is added to the database) may be collected at incremental data cubes (corresponding to tree 103) before being merged into the main data cube, to allow for query consistency without locking. For example, merging of data into the main data cube may be performed only when no outstanding queries are being responded to, so that data and addressing within the main data cube remain consistent during a query. Unlike conventional techniques that may lock (render inaccessible) a portion of the main data cube during insertion, embodiments of the claimed subject matter are still capable of loading new data during a query without locking the main data cube, since incoming data is loaded into incremental data cubes. When the incremental data cubes exceed a certain threshold size, merging of the data in the incremental data cubes is performed into the main data cube without the use of locks, while maintaining query consistency while keeping the amount of storage (memory and disk space) used to a specific and adjustable limit.

Figure 2:
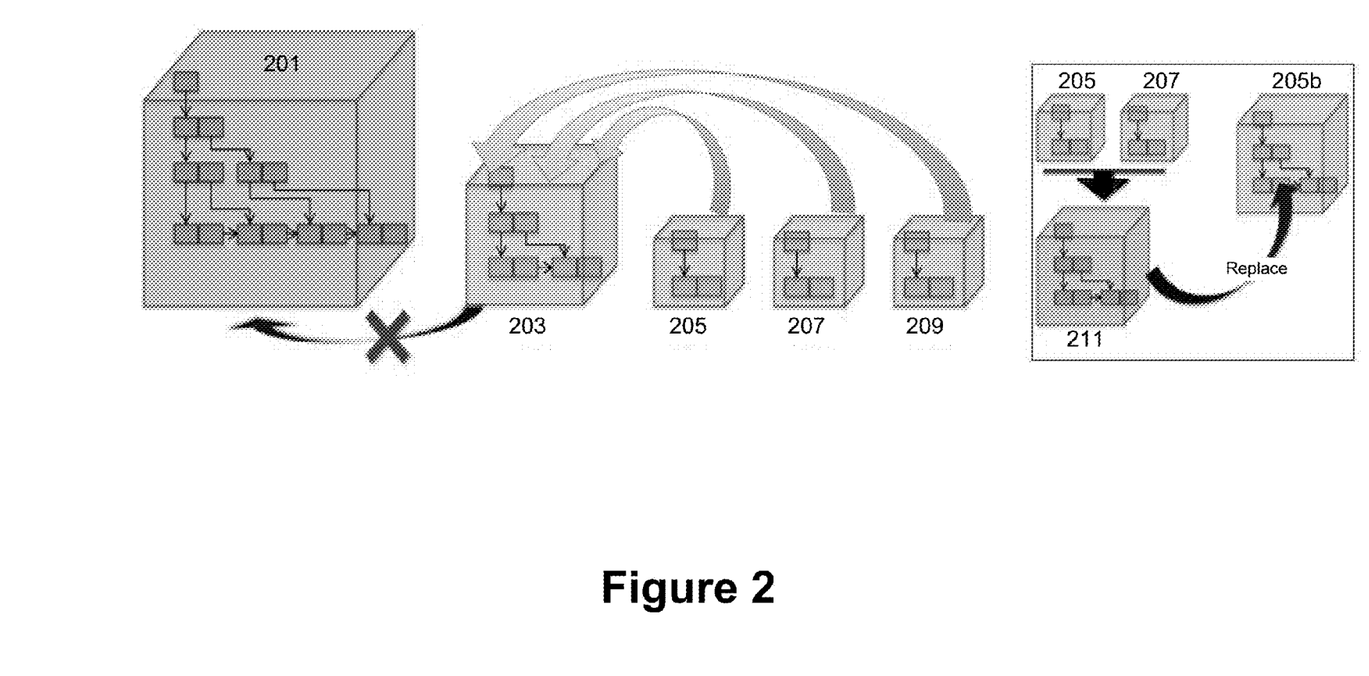
FIG. 2 depicts an exemplary loading of incoming data into incremental data cubes, in accordance with embodiments of the present invention.

FIG. 2 depicts an exemplary loading of incoming data into incremental data cubes (203, 205, 207, 209), in accordance with embodiments of the present invention. Embodiments of the claimed subject matter are directed to merging data from incremental indices to the main index (corresponding to the main data cube 201) by using copies of vertical segments of B-Tree pages of the respective indices to maintain consistency of data during queries. As depicted in FIG. 2, data may be merged in a series of steps, one segment at a time. For example, incremental data is loaded into one or more B-Tree indexed incremental cubes (cubes 205, 207, and 209). Data queries are answered by running the data query against all incremental cubes and the main data cube and aggregating the results.

Based on a detected event, the incremental cubes (205, 207, and 209) may be merged using a side cube. For example, incremental cube 1 (205) and incremental cube 2 (207) may be merged using a side cube 211, which replaces incremental cube 1 (205) as the new incremental cube 1 (205b) after the merger. According to one or more embodiments, the detected event may be based on a trigger, such as when the number of incremental cubes exceeds a pre-determined threshold. Alternately, the detected event may be based on a pre-determined amount of time, e.g., at periodic intervals. In one or more embodiments, the incremental cubes may be merged out of place.

According to one or more embodiments, data from the incremental cubes 205, 207, 209 may be merged into a primary incremental cube 203 that is isolated from the incremental merging process. For example, data from the incremental cubes 205, 207, and 209 may be accumulated in the primary incremental cube 203, thus while incremental data cubes 205, 207, and 209 may be merged together and replaced to keep the number of incremental cubes below a threshold number, the primary incremental data cube 203 is not a candidate for this procedure. In one or more embodiments, data is not merged into the main cube 201 from the primary incremental cube 203 until the size of the primary incremental cube 203 exceeds a threshold size.

Figure 3:
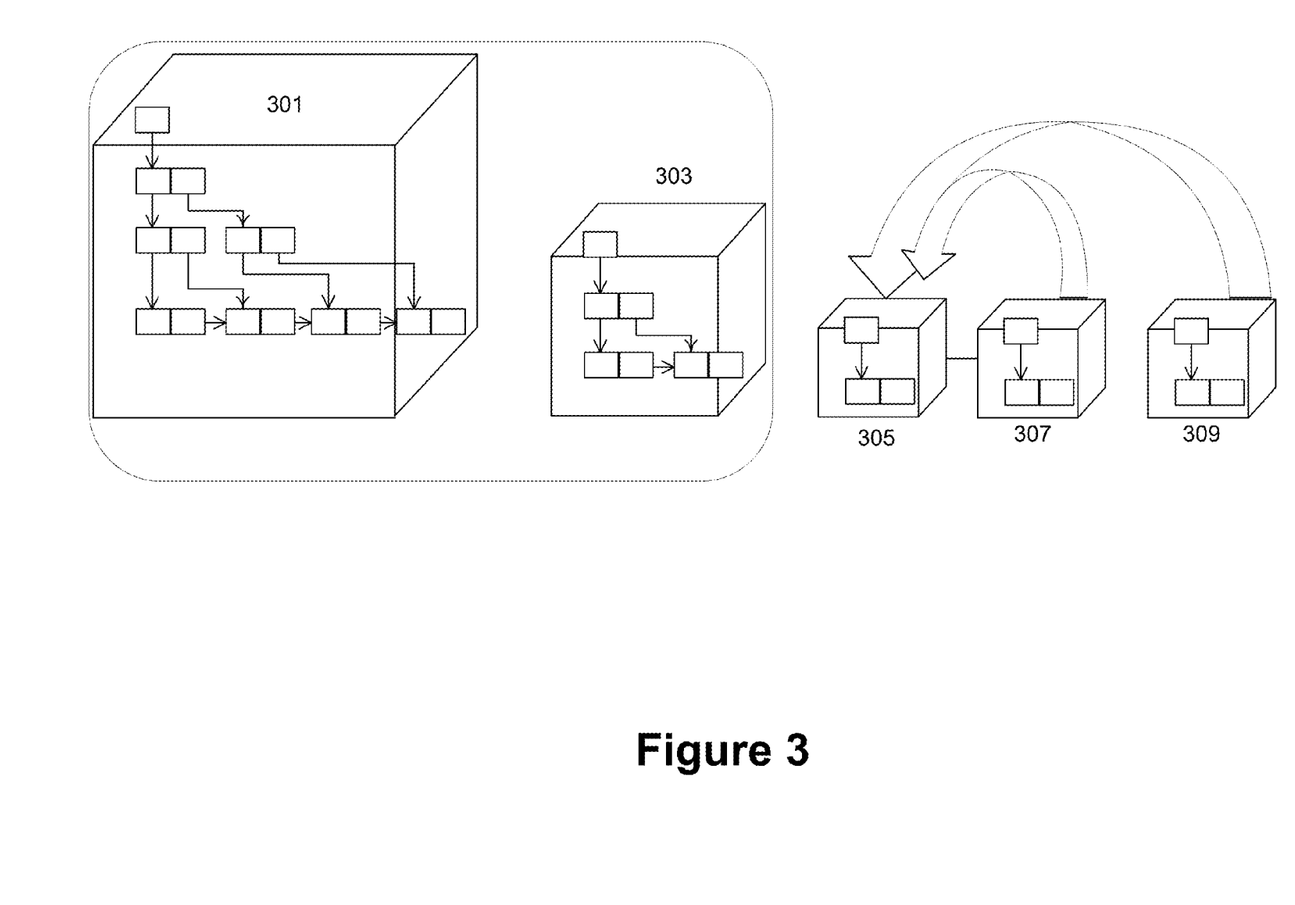
FIG. 3 depicts an exemplary merging of data from an incremental data cube to a main data cube, in accordance with embodiments of the present invention.

FIG. 3 depicts an exemplary merging of data from an incremental data cube 303 to a main data cube 301, in accordance with embodiments of the present invention. As depicted in FIG. 3, the incremental data cube 303 is the primary incremental data cube 303 that accumulates the data from other incremental data cubes (305, 307, 309) prior to the merging procedure. During the merging procedure, the primary incremental data cube 303 and main data cube 301 are isolated from new incoming data, with the primary incremental data cube 303 also being isolated from incremental mergers from incremental data cubes (e.g., incremental data cubes 305, 307, and 309.

In one or more embodiments, the primary incremental data cube is merged with the main data cube in-place, therefore requiring no additional storage. In one or more further embodiments, sibling pointers are not used during the merger process. Newly inserted data may continue to be loaded in incremental data cubes (305, 307 and 309) normally as described above during this process. Merging of the incremental data cubes (not including the primary incremental data cube) due to space constraints (e.g., too many existing incremental data cubes) may also continue during the merger of the primary incremental data cube 303 to the main data cube 301.

Figure 4:
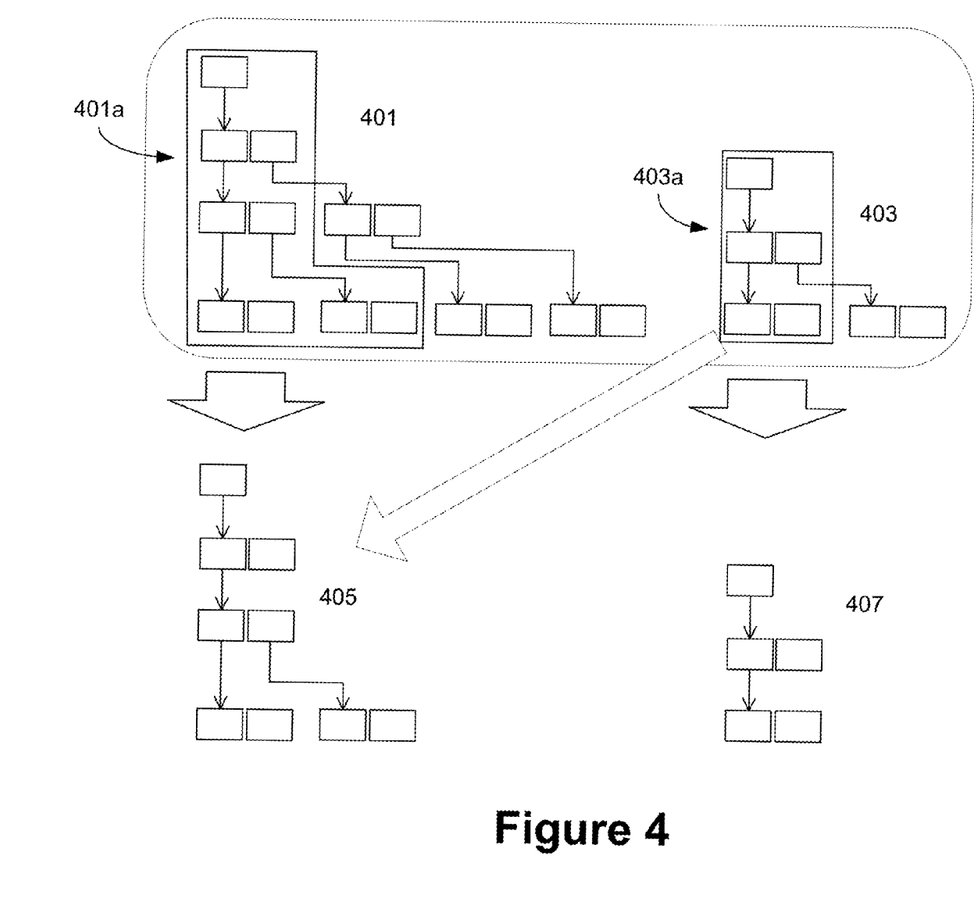
FIG. 4 exemplary pages of B-Tree indices of MOLAP data cubes during a copy phase, in accordance with embodiments of the present invention.

FIG. 4 exemplary pages of B-Tree indices (401, 403) of MOLAP data cubes during a copy phase, in accordance with embodiments of the present invention. As depicted in FIG. 4, a page of a B-Tree index of an incremental data cube—such as the primary incremental data cube described above with respect to FIGS. 2 and 3—is selected to be merged to the main data cube. Vertical segments 401a of the B-Tree index of the main cube are identified that overlap the data selected from the primary incremental cube.

As depicted in FIG. 4, for example, the segment in the box of the main cube index 401 is identified as overlapping with the data selected 403a from the primary incremental cube 403. Copies of the vertical segment 401a and the selected data from the primary incremental cube 403a are created (e.g., 405 and 407, respectively), and the data in the selection in 403a being merged into the copy of the main cube 405. In one or more embodiments, the copy of the selected pages (407) is retained temporarily until existing queries are completed. During the merging process, the data selected from the incremental cube 403a and the copy of the segment of the main cube 405 are still available to respond to queries via the copy of the selected pages 407, with the selected pages in the incremental cube (403a) being deleted after queries that access those pages are completed. Once the merger is completed, new queries begin processing at the new B-Tree root.

In one embodiment, the size of the vertical segment selected is based on the storage available in the system to perform the merger. According to one or more embodiments, each of the selected pages may be added and replaced atomically with respective copies, with the process being repeated until every page in the selection of the primary incremental cube is processed, and until all data in the primary incremental cube is merged from the primary incremental cube to the main data cube.

Figure 5:
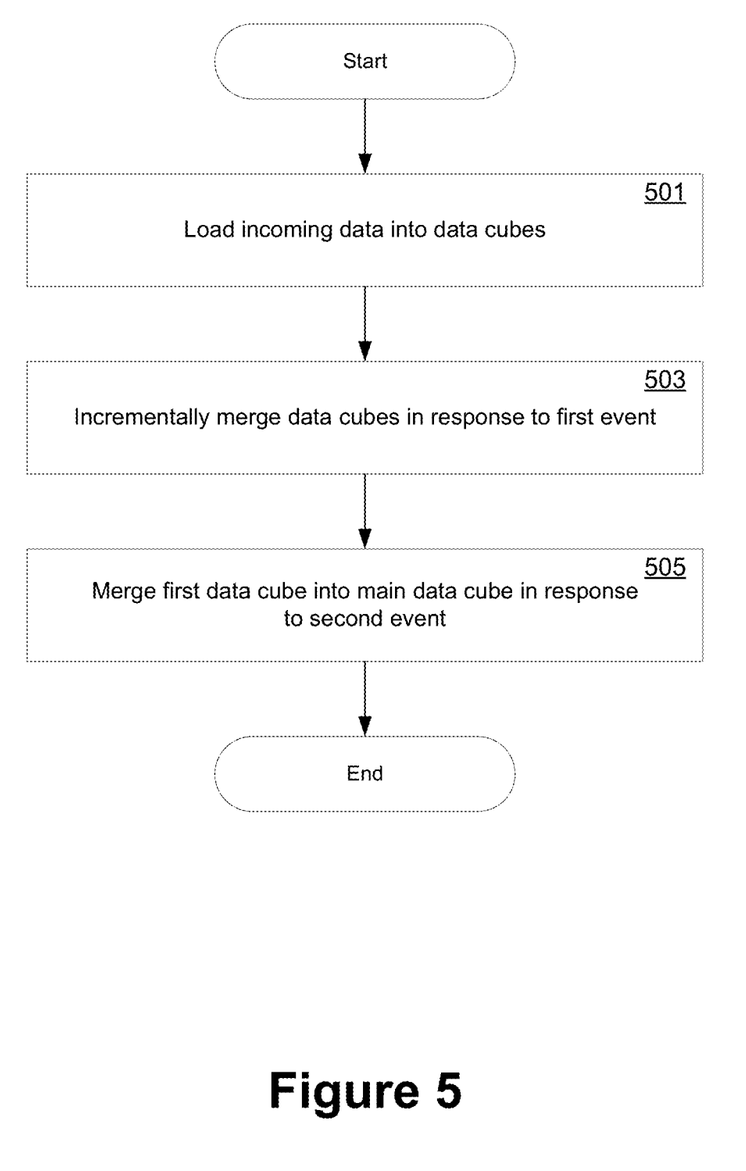
FIG. 5 depicts an exemplary flowchart of a method for incrementally merging data in a MOLAP system, in accordance with embodiments of the present invention.

FIG. 5 depicts an exemplary flowchart 500 of an exemplary method for incrementally merging data in a MOLAP system, in accordance with embodiments of the present invention. In one embodiment, the process 500 is implemented in whole or in part as computer-executable instructions stored in a computer-readable medium and executed by a processor in a computing device.

As depicted in FIG. 5, incoming data is received in the MOLAP system and loaded into data cubes at step 501. In one or more embodiments, the data cubes may be incremental data cubes dynamically generated in response to receiving the incoming data, or may be pre-existing data cubes with non-full indices. Once received, the data is loaded (processed) and stored according to the one or more dimensions of the data cube, and indexed in the corresponding B-Tree index accordingly.

In one or more embodiments, data continues to be loaded into an existing incremental data cube until the data cube is full, wherein a new incremental data cube and corresponding B-Tree index is generated to load subsequent incoming data. Incremental data cubes are merged at step 503 in response to the occurrence of a first event. For example, incremental data cubes may be merged periodically at pre-determined intervals, the event corresponding to the elapse of such an interval. Incremental data cubes may also or instead be merged when the number of incremental data cubes exceeds a pre-determined number as well. Data from the incremental data cubes may also be periodically merged into a primary incremental data cube that is isolated from the cube-merging process.

Finally, at step 505, the primary incremental data cube is merged into a main data cube of the MOLAP system in response to a second event. In one or more embodiments, the second event may correspond to the size of the primary incremental data cube, if the primary incremental data cube exceeds a threshold size, for example. In one or more embodiments, the primary incremental data cube is merged into the main data cube by atomically selecting segments of the primary incremental data cube, identifying the segments in the main data cube that correspond to the selected segments, creating copies of the selected and identified segments, respectively, and merging the selected segments of the primary incremental data cube into the main data cube. As described herein, the copies of the main cube index segment and the primary incremental data cube index segment is available to be accessed by, and respond to, data queries processed during this time, and may be deleted once all running queries that access the copy of the index segment are completed.

Figure 6:
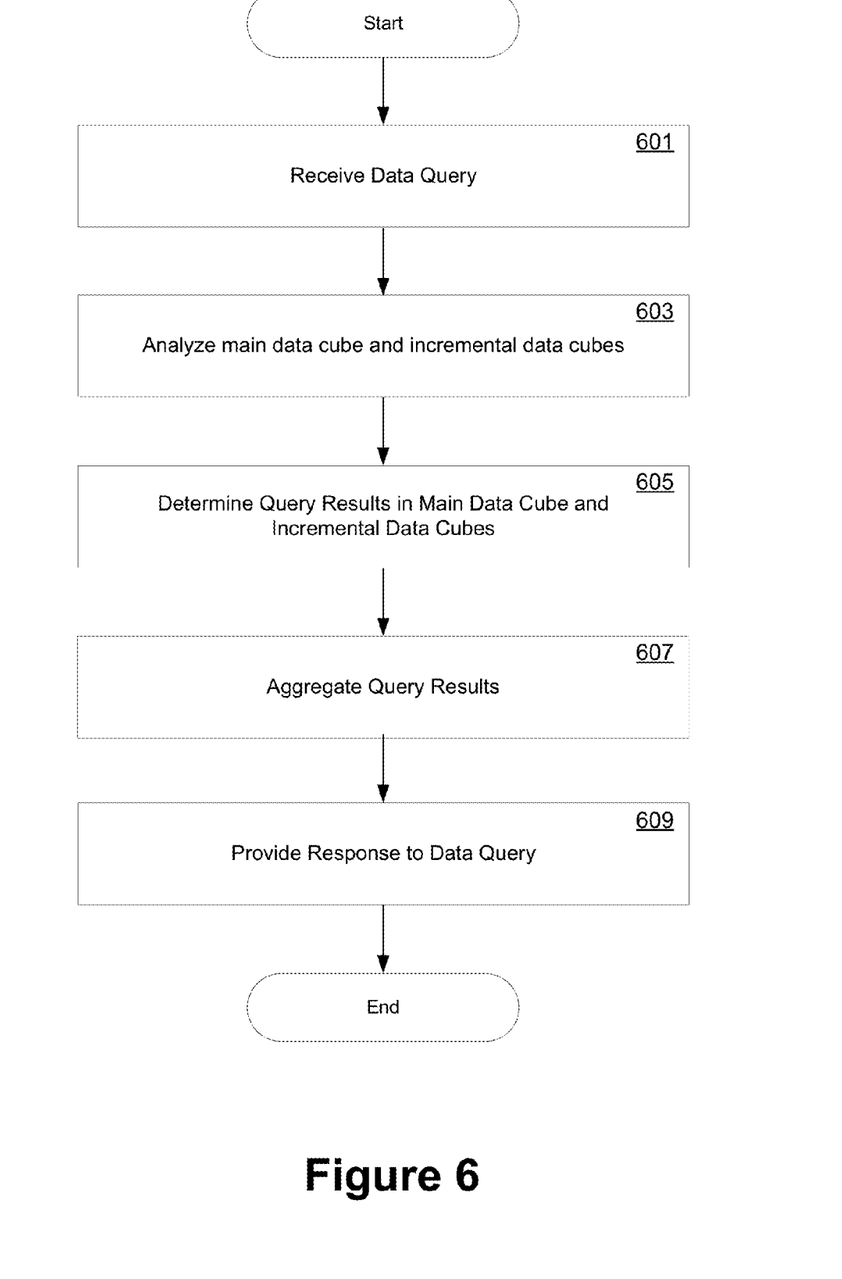
FIG. 6 depicts an exemplary flowchart of a method for responding to data queries in a MOLAP system, in accordance with embodiments of the present invention.

FIG. 6 depicts an exemplary flowchart 600 of a method for responding to data queries in a MOLAP system, in accordance with embodiments of the present invention. In one embodiment, the process 600 is implemented in whole or in part as computer-executable instructions stored in a computer-readable medium and executed by a processor in a computing device.

As depicted in FIG. 6, a data query is received in the MOLAP system at step 601. In one or more embodiments, the MOLAP system may be implemented as one or more data servers in a data warehouse. The data query may be received by, for example, a user remotely located with respect to data warehouse and accessing the data in the MOLAP system via a network connection. In one or more embodiments, the user may be one of a plurality of concurrent users, and the data query may be one of a plurality of queries submitted and processed concurrently.

At step 603, the data query received in step 601 is analyzed against the main data cube and the incremental data cubes. In one or more embodiments, the data query is analyzed by one or more dimensions against indices (e.g., B-Tree indices) of the main and/or incremental data cubes. During a data merger, e.g., when data is merged from an incremental data cube—such as a primary incremental data cube—to the main data cube, copies of pages of indices of one or both of the main data cube and the primary incremental data cube are generated. In one or more embodiments, the generated copies are also accessed and read based on when a data query has been received.

Query results corresponding the query (e.g., search string) are determined in the main data cube and incremental data cubes (and index copies, where applicable) at step 605, aggregated and compiled at step 607, before returning the results to the querying user at step 609.

Figure 7:
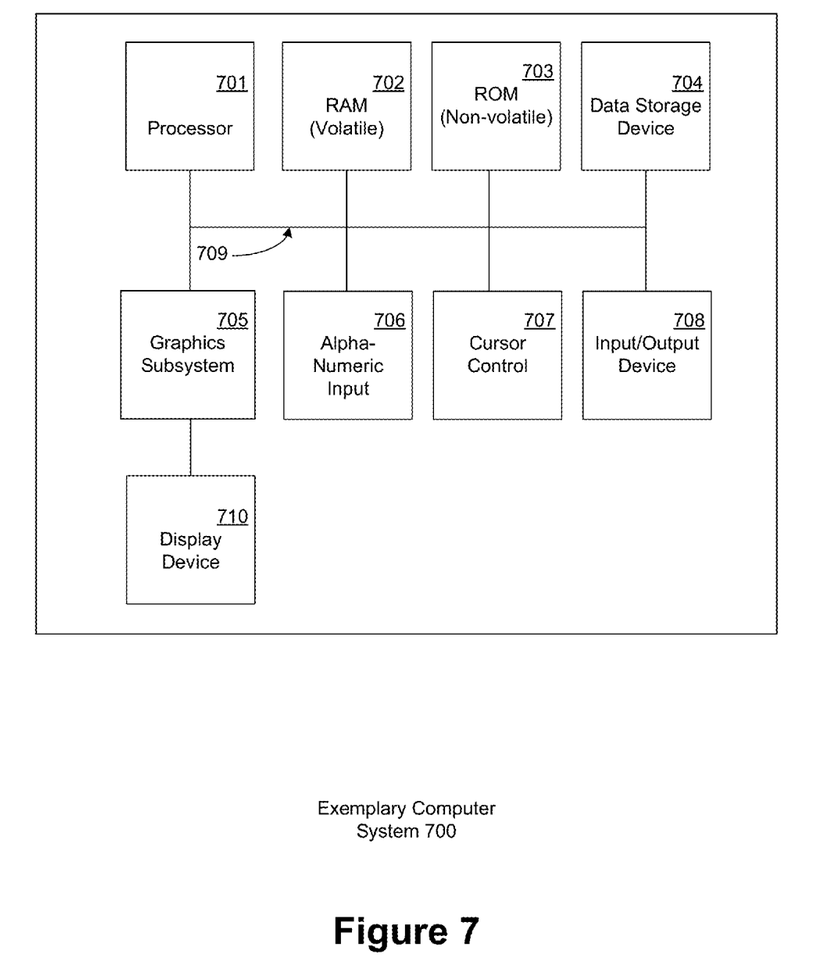
FIG. 7 depicts an exemplary computing environment upon which embodiments of the present disclosure may be implemented.

As presented in FIG. 7, an exemplary computing environment 700 is depicted, in accordance with embodiments of the present disclosure. In one or more embodiments, a data server comprised in the MOLAP system described herein may be implemented as the computing environment 700, for example. In its general configuration, computing environment 700 typically includes at least one processing unit 701 and memory, and an address/data bus 709 (or other interface) for communicating information. Depending on the exact configuration and type of computing environment, memory may be volatile (such as RAM 702), non-volatile (such as ROM 703, flash memory, etc.), some combination of volatile and non-volatile memory, or other suitable device capable of storing for subsequent recall data and/or instructions executable on the processing unit 701. According to one or more embodiments, programmed instructions 711 stored in the memory of computing environment 700 may be executed by the processing unit 701 to perform indexing and data retrieval of the data collected and stored in the main data cube and/or one or more of the incremental data cubes.

In some embodiments, computing environment 700 may also comprise an optional graphics subsystem 705 for presenting information to a user, e.g., by displaying information on an attached or integrated display device 710. Additionally, computing system 700 may also have additional features/functionality. For example, computing system 700 may also include additional storage (removable and/or non-removable) including, but not limited to, magnetic or optical disks or tape. Such additional storage is illustrated in FIG. 7 by data storage device 704. Computer storage media includes volatile and nonvolatile, removable and non-removable media implemented in any method or technology for storage of information such as computer readable instructions, data structures, program modules or other data. RAM 707, ROM 703, and data storage device 704 are all examples of computer storage media.

Computing environment 700 may also comprise a physical (or virtual) alphanumeric input device 706, an physical (or virtual) cursor control or directing device 707. Optional alphanumeric input device 706 can communicate information and command selections to central processor 701. Optional cursor control or directing device 707 is coupled to bus 709 for communicating user input information and command selections to central processor 701. As shown in FIG. 7, computing environment 700 also includes one or more signal communication interfaces (input/output devices, e.g., a network interface card) 707. The signal communication interface may function as a transceiver for the computing environment 700, and allow the transmission and reception of wireless data from one or more base stations.

Embodiments of the claimed subject matter provide methods and systems for a MOLAP database system that performs lock-less bulk insertion while maintaining high query performance and minimizing additional storage requirements. This claimed subject matter provides a novel mechanism for incrementally merging incoming data in a database into a single index structure, that leads to better OLAP query performance. The mechanism described herein allows for merging of two separate index structures while maintaining query consistency and without requiring a versioning scheme, and a novel process for merging two index structures in a series of steps using copies of vertical segments of index tree pages. The process also allows two index structures to be merged while abiding by storage constraints, and allows the execution of queries concurrently while index maintenance is in progress.

The subject matter described herein provides the ability to respond to data queries even during index maintenance, without the need for locking mechanisms during queries, and resulting in less complex processing and higher throughput. Through implementations of the claimed subject matter, data is completely indexed during its entire life cycle, and queries are provided a consistent snapshot of data even during index maintenance, without the need for maintaining versioning. In-memory deployments with limited storage also benefit from the incremental merging described herein.

What is claimed is:
1. A method for multi-dimensional online analytical processing in a relational database, the method comprising:
   loading incoming data into a plurality of data cubes;
   incrementally merging the plurality of data cubes in response to a first event; and
   merging a first data cube of the plurality of data cubes into a main data cube in response to a second event, the merging including:

selecting a first page corresponding to a first segment of the first data cube;

identifying a second page corresponding to a second segment of the main data cube the first segment of the first data cube including data that overlaps data in the second segment of the main data cube;

creating respective copies of the first page and the second page;

merging one of the first page or the copy of the first page with one of the second page or the copy of the second page while satisfying queries for data in the first page using another one of the first page or the copy of the first page and satisfying queries for data in the second page using another one of the second page or the copy of the second page; and deleting the copies of the first and second pages;

wherein the main data cube comprises a principal collection of data for the relational database.

2. The method of claim 1, wherein the incrementally merging the plurality of data cubes comprises:

merging a second and third data cube from the plurality of data cubes into a side merger cube;

replacing the second data cube with the side merger cube in the plurality of data cubes;

generating a new third data cube; and loading new incoming data into the new third data cube.

3. The method of claim 2, wherein the first event corresponds to a number of data cubes of the plurality of data cubes exceeding a threshold number.

4. The method according to claim 2, wherein the first event comprises an elapse of a pre-determined duration of time.

5. The method of claim 2, wherein merging the second and third data cubes into the side merger cube is performed out-of-place.

6. The method of claim 1, wherein the first data cube is isolated from the incremental merging of the plurality of data cubes.

7. The method of claim 1, wherein merging the first data cube into the main data cube is performed in-place.

8. The method of claim 1, wherein the second event corresponds to a size of the first data cube exceeding a threshold size.

9. The method of claim 1, wherein merging the first data cube into the main data cube comprises:

merging the copy of the second page corresponding to the main data cube with the copy of the first page corresponding to the first data cube to create an updated copy of the second page corresponding to the main data cube;

replacing the second page corresponding to the main data cube with the updated copy of the second page corresponding to the main data cube; and deleting the copy of the first page corresponding to the first data cube and the updated copy of the second page corresponding to the main data cube.

10. The method of claim 9, wherein deleting the copy of the first page corresponding to the first data cube and the updated copy of the second page corresponding to the main data cube is performed after a currently running query is completed.

11. The method of claim 9, wherein selecting the first page comprises selecting multiple pages corresponding to a selected branch of a B-Tree index of the first data cube.

12. The method of claim 11, wherein a size of the selected branch of the B-Tree index is based on a storage space available to perform the merging of the copy of the first page corresponding to the first data cube with the copy of the second page corresponding to the main data cube.

13. The method of claim 12, wherein replacing the second page corresponding to the main data cube with the updated copy of the second page corresponding to the main data cube is performed atomically.

14. The method of claim 1, wherein an index for the relational database is contained entirely in a memory of a computing device.

15. The method of claim 1, wherein the merging comprises performing a lock-less merging of the first data cube into the main data cube.

16. The method of claim 1, where in the plurality of data cubes comprises a plurality of B-tree indexed data cubes.

17. The method of claim 1, further comprising:

receiving a data query;

in an online relational database comprising a main data cube and a plurality of incremental data cubes, analyzing the main data cube and the plurality of incremental data cubes based on the data query;

determining a plurality of query results in the main data cube and the plurality of incremental data cubes responsive to the data query;

aggregating the plurality of query results; and providing a response to the data query that includes the aggregated plurality of query results.

18. The method of claim 17, further comprising:

updating at least one of the main data cube and an incremental data cube of the plurality of incremental data cubes, wherein the updating is performed contemporaneously with the analyzing.

19. The method of claim 18, wherein no portion of the relational database is locked to the analyzing while the updating is being performed.

20. An online relational database device, the device comprising:

a memory device configured to store a main data cube and a plurality of incremental data cubes comprising a relational database;

a processor coupled to the memory device and configured:

to load incoming data into the plurality of incremental data cubes, to incrementally merge the plurality of incremental data cubes in response to an event, to merge a first incremental data cube of the plurality of incremental data cubes into the main data cube, wherein to merge the first incremental data cube into the main data cube, the processor is further configured to:

select a first page corresponding to a first segment of the first incremental data cube, identify a second page corresponding to a second segment of the main data cube the first segment of the first incremental data cube including data that overlaps data in the second segment of the main data cube, create respective copies of the first page and the second page, merge one of the first page or the copy of the first page with one of the second page or the copy of the second page while satisfying queries for data in the first page using another one of the first page or the copy of the first page and satisfying queries for data in the second page using another one of the second page or the copy of the second page, and delete the copies of the first and second pages, after merging the first incremental data cube and the main data cube, to delete the first incremental data cube, to analyze remaining incremental data cubes of the plurality of incremental data cubes and the main data cube based on a received data query, and to aggregate a plurality of data results received from analyzing the remaining incremental data cubes of the plurality of incremental data cubes and the main data cube, wherein the processor is operable to load the incoming data into the plurality of incremental data cubes and to respond to the received data query contemporaneously.

21. The device of claim 20, wherein to incrementally merge the plurality of incremental data cubes, the processor is further configured to merge a second incremental data cube and a third incremental data cube from the plurality of incremental data cubes into a side merger cube, replace the second incremental data cube with the side merger cube in the plurality of incremental data cubes, generate a new third incremental data cube, and load new incoming data into the new third incremental data cube.

22. The device of claim 20, wherein to merge the first incremental data cube into the main data cube, the processor is further configured to:

merge the copy of the second page corresponding to the main data cube with the copy of the first page corresponding to the first incremental data cube to create an updated copy of the second page corresponding to the main data cube, replace the second page corresponding to the main data cube with the updated copy of the second page corresponding to the main data cube, and delete the copy of the first page corresponding to the first incremental data cube and the updated copy of the second page corresponding to the main data cube.

23. The device of claim 20, wherein an index for the relational database is contained entirely in the memory device.

24. The device of claim 20, wherein the processor is configured merge the first incremental data cube into the main data cube lock-lessly.

25. The device of claim 20, wherein the plurality of data cubes comprises a plurality of B-tree indexed data cubes.

* * * * *

UNITED STATES PATENT AND TRADEMARK OFFICE
CERTIFICATE OF CORRECTION

PATENT NO. : 10,037,355 B2  
APPLICATION NO. : 14/793557  
DATED : July 31, 2018  
INVENTOR(S) : Ramabrahmam Velury Page 1 of 1

It is certified that error appears in the above-identified patent and that said Letters Patent is hereby corrected as shown below:

In the Specification

In Column 5, Line 51, delete "309." and insert --309).-- therefor

In Column 8, Line 15, delete "707," and insert --702,-- therefor

In the Claims

In Column 10, Line 13, in Claim 16, delete "where in" and insert --wherein-- therefor Signed and Sealed this
Twentieth Day of August, 2019

Andrei Iancu
*Director of the United States Patent and Trademark Office*